(12) United States Patent
Favre et al.

(10) Patent No.: US 8,986,772 B2
(45) Date of Patent: Mar. 24, 2015

(54) CONFECTIONERY COMPOSITIONS

(75) Inventors: Thomas Louis Francois Favre, Wormerveer (NL); Hendrikus Slager, Wormerveer (NL); Imro 'T Zand, Wormerveer (NL); Frederick William Cain, Voorburg (NL); Yvonne Hildering, Wormerveer (NL)

(73) Assignee: Loders Croklaan B.V., Wormerveer (NL)

( * ) Notice: Subject to any disclaimer, the term of this patent is extended or adjusted under 35 U.S.C. 154(b) by 634 days.

(21) Appl. No.: 12/670,094

(22) PCT Filed: Jul. 18, 2008

(86) PCT No.: PCT/GB2008/002491
§ 371 (c)(1),
(2), (4) Date: May 12, 2010

(87) PCT Pub. No.: WO2009/013473
PCT Pub. Date: Jan. 29, 2009

(65) Prior Publication Data
US 2010/0215811 A1     Aug. 26, 2010

(30) Foreign Application Priority Data

Jul. 23, 2007   (EP) .................................. 07252913

(51) Int. Cl.
*A23G 1/54* (2006.01)
*A23D 9/00* (2006.01)
*A23G 3/34* (2006.01)
*A23G 3/40* (2006.01)

(52) U.S. Cl.
CPC .. *A23D 9/00* (2013.01); *A23G 1/54* (2013.01); *A23G 3/346* (2013.01); *A23G 3/40* (2013.01)
USPC ............................................. 426/613; 426/607

(58) Field of Classification Search
None
See application file for complete search history.

(56) References Cited

U.S. PATENT DOCUMENTS

| | | | |
|---|---|---|---|
| 5,472,727 A * | 12/1995 | Campbell et al. ............. | 426/570 |
| 5,554,408 A | 9/1996 | Cain et al. | |
| 5,762,990 A | 6/1998 | Wada et al. | |
| 5,786,019 A * | 7/1998 | Cain et al. ..................... | 426/607 |
| 5,843,497 A | 12/1998 | Sundram et al. | |
| 5,874,117 A | 2/1999 | Sundram et al. | |
| 5,968,584 A * | 10/1999 | Cain et al. ..................... | 426/607 |
| 7,611,744 B2 * | 11/2009 | Cain et al. ..................... | 426/606 |
| 7,700,146 B2 * | 4/2010 | Cleenewerck ................ | 426/607 |
| 7,947,323 B2 * | 5/2011 | Cleenewerck et al. ....... | 426/607 |
| 2001/0028914 A1 | 10/2001 | Okada et al. | |
| 2009/0068318 A1 * | 3/2009 | Cleenewerck et al. ......... | 426/93 |

FOREIGN PATENT DOCUMENTS

| | | |
|---|---|---|
| EP | 0 293 194 B1 | 8/1992 |
| EP | 0612478 A1 | 8/1994 |
| EP | 0 815 738 A1 | 1/1998 |
| EP | 0824869 A1 | 2/1998 |
| EP | 1719412 A1 | 11/2006 |
| WO | WO 94/09098 A1 | 4/1994 |
| WO | WO 94/19953 | 9/1994 |
| WO | WO 95/07619 | 3/1995 |
| WO | WO 95/07620 | 3/1995 |
| WO | WO 96/10338 | 4/1996 |
| WO | WO 2007/090477 A1 | 8/2007 |

OTHER PUBLICATIONS

Hui, Y. H. 1996. Bailey's Industrial Oll and Fat Products, 5th edition, vol. 1. John Wiley & Sons, Inc., New York. p. 444-447.*
Swern, D. 1979. Bailey's Industrial Oll and Fat Products, vol. 1, 4th edition. John Wiley & Sons, New York. p. 318 & 385.*
Rombauer, Irma, S. et al. 1997. Joy of Cooking. Plume Penguin Group. New York. p. 687 & 696.*
Epstein, Becky. 1986. Substituting Ingredients, 3$^{rd}$ edition. The Globe Pequot Press, Guilford, CT. p. 127.*
Rombauer, I. 1975. Joy of Cooking. Penguin Group, New York. p. 696-697.*
Charley, Helen. 1970. Food Science. The Ronald Press Company, New York, p. 248-249.*

(Continued)

*Primary Examiner* — Carolyn Paden
(74) *Attorney, Agent, or Firm* — Hamilton, Brook, Smith & Reynolds, P.C.

(57) ABSTRACT

Confectionery compositions, suitable for fillings, comprise one or more confectionery additives selected from sugar, cocoa powder, milk powder, yoghurt powder, flavoring and emulsifier, together with a fat blend comprising: (i) polyunsaturated fatty acid residues in an amount of greater than 40% by weight based on total fatty acid residues in the fat blend; (ii) S2U triglycerides in an amount of between 10 and 50% by weight based on the weight of the fat blend, wherein S is a saturated fatty acid residue having 12-24 carbon atoms and U is an unsaturated fatty acid residue having 12-24 carbon atoms; and (iii) H2M+M2H triglycerides in an amount of less than 5% by weight based on the weight of the fat blend, wherein H is a saturated fatty acid residue having at least 16 carbon atoms and M is a saturated fatty acid residue having 8 to 14 carbon atoms; and wherein the fat blend has a content of trans fatty acid residues of less than 3% by weight based on total fatty acid residues in the fat blend, a content of diglycerides of less than 3% by weight of the fat blend and a C12 fatty acid residue content of less than 5% by weight based on total fatty acid residues in the fat blend. The composition is particularly useful as a confectionery or bakery filling.

23 Claims, No Drawings

(56) References Cited

OTHER PUBLICATIONS

Notification Concerning Transmittal of Copy of International Preliminary Report on Patentability, and International preliminary Report on patentability, International Application No. PCT/GB2008/002491, mail date Feb. 4, 2010.

International Search Report and the Written Opinion of the International Searching Authority, dated Oct. 31, 2008 (date of mailing), issued in PCT/GB2008/002491.

Extended European Search Report, EP Application No. 07252913.4-2114; Dated Jan. 18, 2008.

* cited by examiner

CONFECTIONERY COMPOSITIONS

This application is the U.S. National Stage of International Application No. PCT/GB2008/002491, filed Jul. 18, 2008, which designates the U.S., published in English, and claims priority under 35 U.S.C. §§119 or 365 (c) to European Application No. 07252913.4, filed Jul. 23, 2007.

BACKGROUND OF THE INVENTION

This invention relates to a confectionery composition, to a method of making the confectionery composition and to the use of the composition as a filling in a confectionery product or a bakery product.

Many confectionery products such as chocolate and chocolate-like products contain triglyceride fats. The fats impart beneficial textural and organoleptic properties to the products. For example, the flavour release and cool taste of chocolate is at least partly due to the melting profile of the triglyceride fats that it contains.

There have been concerns for health reasons about diets that are high in saturated fats. Principally, the concerns are about the increased risk of raised cholesterol levels and cardiovascular problems. As a result of these concerns and due to the perceived benefits of polyunsaturated fatty acids in the diet, certain bodies have recommended replacing saturated fatty acids in the diet by polyunsaturated fatty acids.

Triglyceride fats containing saturated fatty acids generally have higher melting points than the corresponding triglycerides containing polyunsaturated fatty acids. The hardness of the saturated fats at room temperature contributes to their benefits as structural fats. For example, hardstock fats for margarines need to have a significant solids content at room temperature, otherwise the margarine is too runny. The same considerations apply to many confectionery products. Therefore, it is not a trivial matter to replace saturated fats by polyunsaturated fats because a straight substitution of the fats is likely to lead to a product which is unacceptable to the consumer and which may be difficult or even impossible to produce.

EP-A-0824869 relates to bloom inhibiting fat blends based on H2M- and M2H-type triglycerides, where H is saturated fatty acid having at least 16 carbon atoms and M is saturated fatty acid having 8 to 14 carbon atoms. The aim of the blends is to inhibit bloom. Similarly, EP-A-0612478 discloses fats that are added to cocoa butter at levels of 5 to 30%. The additives are intended to shorten tempering time and reduce bloom.

WO 96/10338 relates to flexible ice cream coatings. The fats aim to overcome the brittleness problems of some prior art ice cream coatings, whilst remaining easy to apply to ice cream.

U.S. Pat. No. 5,843,497 discloses fat blends that are beneficial for cholesterol levels and for increasing HDL and the HDL/LDL ratio. The fat blends contain 15 to 40% linoleic acid.

U.S. Pat. No. 5,874,117 discloses blends of palm fat and corn oil as shortenings for baking or frying. U.S. Pat. No. 5,472,727 relates to whippable, water-continuous fat emulsions containing lower levels of saturated fat. Neither document relates to confectionery products.

EP-A-1719412 discloses a pre-mix for bakery products comprising a shortening.

U.S. Pat. No. 5,762,990 describes a fat composition for a nut filling comprising 35-60% by weight StOSt.

SUMMARY OF INVENTION

We have now found a fat composition that is relatively high in polyunsaturated fatty acids and yet is suitable for confectionery compositions that are used at ambient temperature (e.g., 15 to 30° C.), particularly as a filling for a confectionery product. The composition has surprisingly good stability in terms of its shelf-life, is sufficiently hard at ambient temperature to be useful in a confectionery product and has desirable organoleptic properties such as good flavour release and the property of being cool melting.

DETAILED DESCRIPTION OF THE INVENTION

According to the invention in a first aspect, there is provided a confectionery composition, suitable for fillings, comprising one or more confectionery additives selected from sugar, cocoa powder, milk powder, yoghurt powder, flavouring and emulsifier, together with a fat blend comprising:
 (i) polyunsaturated fatty acid residues in an amount of greater than 40% by weight based on total fatty acid residues in the fat blend;
 (ii) S2U triglycerides in an amount of between 10 and 50% by weight based on the weight of the fat blend, wherein S is a saturated fatty acid residue having 12-24 carbon atoms and U is an unsaturated fatty acid residue having 12-24 carbon atoms; and
 (iii) H2M+M2H triglycerides in an amount of less than 5% by weight based on the weight of the fat blend, wherein H is a saturated fatty acid residue having at least 16 carbon atoms and M is a saturated fatty acid residue having 8 to 14 carbon atoms;
and wherein the fat blend has a content of trans fatty acid residues of less than 3% by weight based on total fatty acid residues in the fat blend, a content of diglycerides of less than 5% by weight of the fat blend and a C12 fatty acid residue content of less than 5% by weight based on total fatty acid residues in the fat blend.

In another aspect, the invention provides a method of making a confectionery composition which comprises combining one or more confectionery additives selected from sugar, cocoa powder, milk powder, yoghurt powder, flavouring and emulsifier, with a fat blend comprising:
 (i) polyunsaturated fatty acid residues in an amount of greater than 40% by weight based on total fatty acid residues in the fat blend;
 (ii) S2U triglycerides in an amount of between 10 and 50% by weight based on the weight of the fat blend, wherein S is a saturated fatty acid residue having 12-24 carbon atoms and U is an unsaturated fatty acid residue having 12-24 carbon atoms;
 (iii) H2M+M2H triglycerides in an amount of less than 5% by weight based on the weight of the fat blend, wherein H is a saturated fatty acid residue having at least 16 carbon atoms and M is a saturated fatty acid residue having 8 to 14 carbon atoms;
and wherein the fat blend has a content of trans fatty acid residues of less than 3% by weight based on total fatty acid residues in the fat blend, a content of diglycerides of less than 5% by weight of the fat blend and a C12 fatty acid residue content of less than 5% by weight based on total fatty acid residues in the fat blend.

A further aspect of the invention is the use of a fat blend comprising:
 (i) polyunsaturated fatty acid residues in an amount of greater than 40% by weight based on total fatty acid residues in the fat blend;
 (ii) S2U triglycerides in an amount of between 10 and 50% by weight based on the weight of the fat blend, wherein S is a saturated fatty acid residue having 12-24 carbon atoms and U is an unsaturated fatty acid residue having 12-24 carbon atoms;

(iii) H2M+M2H triglycerides in an amount of less than 5% by weight based on the weight of the fat blend, wherein H is a saturated fatty acid residue having at least 16 carbon atoms and M is a saturated fatty acid residue having 8 to 14 carbon atoms;

and wherein the fat blend has a content of trans fatty acid residues of less than 3% by weight based on total fatty acid residues in the fat blend, a content of diglycerides of less than 5% by weight of the fat blend and a C12 fatty acid residue content of less than 5% by weight based on total fatty acid residues in the fat blend, as a filling in a confectionery product or a bakery product.

Another aspect of the invention is a confectionery product or a bakery product having a filling comprising a confectionery composition of the invention.

The invention also provides, in a yet further aspect, a method of making a confectionery product or a bakery product, which comprises filling an edible substrate with a confectionery composition of the invention.

Preferably, the polyunsaturated fatty acid residues are present in the fat blend that is used in the invention in an amount of greater than 42% by weight based on total fatty acid residues in the fat blend, more preferably greater than 43%, such as greater than 45%, or from 41 to 50%. The term "fatty acid residues", as used herein, refers to fatty acid acyl groups that are bonded to a glyceride backbone (together with any small amounts of other fatty acid esters and free fatty acids, if present) and the term is intended to be synonymous with what is sometimes simply referred to as the fatty acid content of a fat. The levels of fatty acids in a glyceride can be determined by methods that are well known to those skilled in the art. The fat blends contain S2U glycerides (S2U glycerides) i.e., glycerides having two S and one U fatty acyl groups in the glyceride. The S2U content of the composition is preferably from 15 to 35% by weight of the fat blend, more preferably from 20 to 30% by weight, such as from 25 to 29% by weight. Preferably, the H2M+M2H content is less than 3% by weight of the fat blend, more preferably less than 1% by weight of the fat blend.

The composition of the invention is typically low in trans fatty acids. The term "fatty acid", as used herein, refers to straight chain, saturated or unsaturated, carboxylic acids having from 12 to 24 carbon atoms. Preferably, the fat blend has a content of trans fatty acid residues of less than 1% by weight of the fat blend, more preferably less than 0.5% by weight of the fat blend. The composition of the invention may also have a low content of diglycerides and/or monoglycerides and may be predominantly triglycerides i.e., the fat blend may comprise greater than 95% or greater than 98%, such as greater than 99%, by weight triglycerides. Preferably, the fat blend has a content of diglycerides of less than 3% by weight of the fat blend, more preferably less than 1% by weight of the fat blend, even more preferably less than 0.5% by weight of the fat blend.

The fat blend of the invention will generally comprise C16 and C18 fatty acid residues, optionally together with other fatty acid residues. Preferably, at least 50% by weight of the fatty acids in the fat blend are C16 and C18 fatty acids, more preferably at least 60%, such as at least 70% or at least 75%. Typically, the fat blend has a C12 fatty acid residue content of less than 3% by weight of the fat blend, more preferably less than 1% by weight of the fat blend.

The fat blend of the invention preferably comprises at least two fats A and B. The blend may be a blend of fats A and B alone, or together with one or more other fats. Fat A preferably has an S2U level of at least 50% by weight and fat B preferably has a linoleic acid content of at least 50% by weight. Preferably, fat B has a linoleic acid content of at least 55% by weight. Preferably, fat B is selected from soybean oil, rapeseed oil, sunflower oil, safflower oil, corn oil and mixtures thereof. Sunflower oil and safflower oil, and their mixtures, are particularly preferred as fat B. In a particularly preferred embodiment, fat B is a 90:10 to 10:90 by weight mixture of sunflower oil and safflower oil. Fat A is preferably shea stearin.

Preferred blends of fat A and fat B are those which comprise fat A in an amount of from 10 to 50% by weight of the fat blend, more preferably from 20 to 40% by weight, such as from 25 to 35% by weight. The fat blends preferably comprise fat B in an amount of from 50 to 90% by weight of the fat blend, more preferably from 60 to 80% by weight of the fat blend, such as from 65 to 75% by weight.

The fat blend preferably has one or more of: an N20 value of at least 15, more preferably at least 20; an N25 value of at least 10, such as at least 15; an N30 value of at least 5, more preferably at least 8; and an N40 value of less than 1, such as less than 0.5. These N values are determined on fats stabilised for 40 hours at 20° C.

The confectionery compositions of the invention are typically useful as fillings for confectionery products and/or bakery products, wherein the products are adapted to be stored and/or sold and/or consumed at ambient temperature i.e., 10° C. to 30° C. The products are not generally frozen. The fillings may be applied to substrates such as biscuits, sponges or wafers and may be impregnated into the wafers. The biscuits, sponges or wafers can be present as single layers or in multiple layers with the filling between adjacent layers.

The fillings may be covered with an outer layer of chocolate, either when applied on biscuits, sponges or wafers, or when not so applied. Thus, a preferred confectionery product of the invention comprises a chocolate outer layer filled with the composition of the invention, optionally comprising a biscuit, sponge or wafer in association with the filling. Typically, the outer layer of chocolate will encapsulate the filling and the biscuit or wafer, if present. The confectionery product may be a bar, optionally divided into segments. The segments may be adapted to allow part of the product to be broken off by the user and consumed separately from the remainder of the product.

In another embodiment, a bakery composition of the invention comprises a baked product having a filling comprising a confectionery composition of the invention.

Baked products include bread, cakes, biscuits and sponges. A baked product may comprise a biscuit, sponge or wafer comprising two or more layers of biscuit, sponge or wafer, with the filling between adjacent layers. The bakery product may comprise two layers of biscuit, sponge or wafer with the filling sandwiched between the layers.

The filled confectionery products and the bakery products will generally be packaged, for example in a wrapper, for sale.

The compositions of the invention comprise one or more confectionery additives selected from sugar, cocoa powder, milk powder, yoghurt powder, flavouring and emulsifier. Preferably, the compositions comprise at least sugar and cocoa powder and, optionally, one or more of the other components. Other compositions comprise at least sugar and flavouring and, optionally, one or more of the other components. Additional components such as milk, water, colouring agents and preservatives, more preferably colouring agents and preservatives, may optionally be present in the compositions. Sugar includes sucrose, dextrose and fructose (preferably sucrose). Flavourings include, for example, strawberry, raspberry, vanilla, mint, orange, lemon, lime, coffee and the like. An example of a suitable emulsifier is lecithin. Preferably, the compositions of the invention do not contain nut solids (e.g., from peanuts, almonds, hazelnuts, walnuts, cashew nuts, pistachio nuts, macadamia nuts and pecan nuts), such as nut paste.

Typically, compositions of the invention will comprise the fat blend in an amount of from 5 to 70% by weight, more preferably from 10 to 60% by weight, even more preferably from 20 to 50% by weight, such as from 30 to 40% by weight. Additionally or alternatively, compositions of the invention may comprise sugar (e.g., sucrose) in an amount of from 10 to 80% by weight, more preferably from 20 to 70% by weight, even more preferably from 30 to 60% by weight. Cocoa powder, when present in the compositions of the invention, is preferably present in an amount of from 2 to 20% by weight. Other components, if present, will preferably be present in an amount of from 0.01 to 30% by weight. It will be appreciated that the percentage figures will total 100%.

One preferred composition of the invention comprises the fat blend in an amount of from 10 to 60% by weight, sugar in an amount of from 20 to 70% by weight, optionally cocoa powder in an amount of from 2 to 20% by weight and optionally from 0.01 to 30% by weight of one or more of milk powder, yoghurt powder, flavouring and emulsifier.

Compositions of the invention may be made by combining one or more confectionery additives selected from sugar, cocoa powder, milk powder, yoghurt powder, flavouring and emulsifier, with the fat blend. Typically, the components will be mixed at a temperature at which the fat blend is molten (e.g., at greater than 40° C., such as from 50-80° C.).

Fat blends of the invention may be produced, for example, by blending two or more fats. The term "fat", as used herein, is not intended to imply any particular state and is intended to cover those triglyceride fats that are liquid at room temperature and are also sometimes referred to as oils.

Confectionery products of the invention may be made, for example, by filling an edible substrate with a confectionery composition according to methods well known in the art. Suitable edible substrates include biscuits, wafers and chocolate shells.

The listing or discussion of an apparently prior-published document in this specification should not necessarily be taken as an acknowledgement that the document is part of the state of the art or is common general knowledge.

The following non-limiting examples illustrate the invention and do not limit its scope in any way. In the examples and throughout this specification, all percentages, parts and ratios are by weight unless indicated otherwise.

EXAMPLES

Example 1

The following is an example of a fat blend for use in the invention.

| Product | Weight % |
| --- | --- |
| Sunflower oil | 70 |
| Shea sterine | 30 |
| UMA | 40 h 20° C. |
| N20 NMR | 22.3 |
| N25 NMR | 18.2 |
| N30 NMR | 10.2 |

-continued

| Product | Weight % |
| --- | --- |
| N35 NMR | 1.0 |
| N40 NMR | 0.3 |
| S2U | 27.8 |
| PUFA | 44.3 |
| C12:0 | <1 |
| H2M | <1 |
| Trans | <1 |
| DG total | <3 |

Example 2

The fat blend of Example 1 was used to prepare a confectionery filling according to the following recipe.

|  | % by weight | grams |
| --- | --- | --- |
| Fat SHs/SF 30/70 | 38 | 988 |
| Cocoa powder DR74 | 12 | 312 |
| Skimmed milk powder | 2 | 52 |
| Sugar | 48 | 1248 |
|  | 0 | 0 |
|  | 0 | 0 |
| Additives: |  |  |
| Lecithin | 0.4 | 10.4 |
| Cream vanillin DU-00569 | 0.02 | 0.52 |
| Salt | 0.01 | 0.26 |
| Total weight | 100.43 | 2611.18 |

SHs Shea stearins
SF Sunflower oil

The filling was prepared by using an attritor grinding mill (Wineroto W-1-S with thermostat). The attritor was tempered to 50° C. and rotated at 48 rpm. The ingredients of the recipe were added by starting with the fat, then the sugar, the powders, followed by the other ingredients. The revolution of the attritor was increased to max. 240 rpm. Rotation was kept for 40 minutes to form the filling. The filling was cooled down to 24° C. where it became more viscous. This temperature was also the turning point. The temperature of the filling rises from there to 27° C. where it became thick and finally almost fully steady at 28° C. In small steps it was slowly heated to 32° C. at which temp the cups were filled. The filling was cooled down to 13° C. in a cooling cabinet for 20 minutes. The cups were well tempered. Temperature regime: 24° C.→424.5° C.→15 min→27° C.→10min→28° C. 2 min (very viscous)-→in small steps heated to 32° C. for application.

A filling having a good taste and appearance could be prepared.

The invention claimed is:

1. A confectionery filling composition, comprising: 20 to 70% by weight sugar; cocoa powder in an amount of from 2 to 20% by weight; from 0.01 to 30% by weight of one or more of milk powder, yoghurt powder, flavouring and emulsifier; and from 10 to 60% by weight of a fat blend comprising:
   (i) polyunsaturated fatty acid residues in an amount of greater than 40% by weight based on total fatty acid residues in the fat blend;
   (ii) S2U triglycerides in an amount of between 10 and 50% by weight based on the weight of the fat blend, wherein S is a saturated fatty acid residue having 12-24 carbon atoms and U is an unsaturated fatty acid residue having 12-24 carbon atoms; and (iii) H2+M2H triglycerides in an amount of less than 5% by weight based on the weight of the fat blend, wherein H is a saturated fatty acid residue having at least 16 carbon atoms and M is a saturated fatty acid residue having 8 to 14 carbon atoms;

wherein the fat blend has a content of trans fatty acid residues of less than 3% by weight based on total fatty acid residues in the fat blend, a content of diglycerides of less than 5% by weight of the fat blend and a C12 fatty acid residue content of less than 5% by weight based on total fatty acid residues in the fat blend and wherein the aforementioned percentages of ingredients total 100% of the filling composition.

2. A composition as claimed in claim 1, wherein the polyunsaturated fatty acid residues are present in an amount of greater than 45% by weight based on total fatty acid residues in the fat blend.

3. A composition as claimed in claim 2, wherein the S2U content is from 15 to 35% by weight of the fat blend.

4. A composition as claimed in claim 3, wherein the H2M+M2H content is less than 3% by weight of the fat blend.

5. A composition as claimed in claim 3, wherein the H2M+M2H content is less than 1% by weight of the fat blend.

6. A composition as claimed in claim 5, wherein the fat blend has a content of trans fatty acid residues of less than 1% by weight based on total fatty acid residues in the fat blend.

7. A composition as claimed in claim 5, wherein the fat blend has a content of trans fatty acid residues of less than 0.5% by weight based on total fatty acid residues in the fat blend.

8. A composition as claimed in claim 7, wherein the fat blend has a content of diglycerides of less than 3% by weight of the fat blend.

9. A composition as claimed in claim 8, wherein the fat blend has a C12 fatty acid residue content of less than 3% by weight of the fat blend.

10. A composition as claimed in claim 8, wherein the fat blend has a C12 fatty acid residue content of less than 1% by weight of the fat blend.

11. A composition as claimed in claim 10, wherein the fat blend comprises fats A and B, fat A having an S2U level of at least 50% by weight and fat B having a linoleic acid content of at least 50% by weight.

12. A composition as claimed in claim 11, wherein fat B has a linoleic acid content of at least 55% by weight.

13. A composition as claimed in claim 12, wherein fat B is selected from soybean oil, rapeseed oil, sunflower oil, safflower oil and mixtures thereof.

14. A composition as claimed in claim 13, wherein fat B is a 90:10 to 10:90 by weight mixture of sunflower oil and safflower oil.

15. A composition as claimed in claim 14, wherein fat A is shea stearin.

16. A composition as claimed in claim 15, wherein the fat blend has an N20 value of at least 15.

17. A composition as claimed in claim 16, wherein the fat blend has an N25 value of at least 10.

18. A composition as claimed in claim 17, wherein the fat blend has an N30 value of at least 5.

19. A composition as claimed in claim 18, wherein the fat blend has an N40 value of less than 1.

20. A confectionery product having a filling comprising a confectionery composition of claim 1.

21. A bakery product comprising a baked product having a filling comprising a confectionery composition of claim 1.

22. A method of making a confectionery product or a bakery product, which comprises filling an edible substrate with a confectionery composition of claim 1.

23. A method of making the confectionery filling composition of claim 1 which comprises combining: 20 to 70% by weight sugar; cocoa powder in an amount of from 2 to 20% by weight; from 0.01 to 30% by weight of one or more of milk powder, yoghurt powder, flavouring and emulsifier; and from 10 to 60% by weight of a fat blend comprising:

(i) polyunsaturated fatty acid residues in an amount of greater than 40% by weight based on total fatty acid residues in the fat blend;

(ii) S2U triglycerides in an amount of between 10 and 50% by weight based on the weight of the fat blend, wherein S is a saturated fatty acid residue having 12-24 carbon atoms and U is an unsaturated fatty acid residue having 12-24 carbon atoms;

(iii) H2M+M2H triglycerides in an amount of less than 5% by weight based on the weight of the fat blend, wherein H is a saturated fatty acid residue having at least 16 carbon atoms and M is a saturated fatty acid residue having 8 to 14 carbon atoms;

wherein the fat blend has a content of trans fatty acid residues of less than 3% by weight based on total fatty acid residues in the fat blend, a content of diglycerides of less than 5% by weight of the fat blend and a C12 fatty acid residue content of less than 5% by weight based on total fatty acid residues in the fat blend and wherein a confectionery filling composition is produced and wherein the aforementioned percentages of ingredients total 100% of the filling composition.

\* \* \* \* \*

UNITED STATES PATENT AND TRADEMARK OFFICE
CERTIFICATE OF CORRECTION

| | |
|---|---|
| PATENT NO. | : 8,986,772 B2 |
| APPLICATION NO. | : 12/670094 |
| DATED | : March 24, 2015 |
| INVENTOR(S) | : Thomas Louis Francois Favre et al. |

It is certified that error appears in the above-identified patent and that said Letters Patent is hereby corrected as shown below:

In the Claims

In Claim 1, Column 7, Line 1, delete "H2" and insert --H2M--

Signed and Sealed this
Seventh Day of July, 2015

Michelle K. Lee
*Director of the United States Patent and Trademark Office*